United States Patent
Garcia De La Pena Razquin

(10) Patent No.: US 11,629,698 B2
(45) Date of Patent: Apr. 18, 2023

(54) DEVICE FOR MOUNTING WIND TURBINE COMPONENTS AND MOUNTING METHOD USING SAID DEVICE

(71) Applicant: LEUNAMME TECHNOLOGY S.L., Mutilva (ES)

(72) Inventor: Emmanuel Garcia De La Pena Razquin, Mutilva (ES)

(73) Assignee: LEUNAMME TECHNOLOGY S.L., Mutilva (ES)

(*) Notice: Subject to any disclaimer, the term of this patent is extended or adjusted under 35 U.S.C. 154(b) by 200 days.

(21) Appl. No.: 17/260,189

(22) PCT Filed: Apr. 5, 2019

(86) PCT No.: PCT/ES2019/070230
§ 371 (c)(1),
(2) Date: Jan. 13, 2021

(87) PCT Pub. No.: WO2020/016464
PCT Pub. Date: Jan. 23, 2020

(65) Prior Publication Data
US 2021/0270242 A1    Sep. 2, 2021

(30) Foreign Application Priority Data
Jul. 18, 2018  (ES) ................. P201830723

(51) Int. Cl.
*F03D 13/10*     (2016.01)
*F03D 13/20*     (2016.01)
(Continued)

(52) U.S. Cl.
CPC ............ *F03D 13/10* (2016.05); *B66C 23/185* (2013.01); *B66C 23/30* (2013.01); *B66C 23/32* (2013.01); *F03D 13/20* (2016.05); *F05B 2230/61* (2013.01)

(58) Field of Classification Search
CPC ..... E04H 12/342; B66C 1/108; B66C 23/207; B66C 23/185; B66C 23/30; B66C 23/32;
(Continued)

(56) References Cited

U.S. PATENT DOCUMENTS

2014/0202971 A1    7/2014  Bosco et al.

FOREIGN PATENT DOCUMENTS

| CN | 105439005 A | 3/2016 |
|---|---|---|
| DE | 19741988 A1 | 4/1999 |

(Continued)

OTHER PUBLICATIONS

International Search Report for Corresponding International Application No. PCT/ES2019/070230 (dated Jun. 21, 2019) and English Translation.

*Primary Examiner* — Moshe Wilensky
(74) *Attorney, Agent, or Firm* — Lucas & Mercanti, LLP

(57) ABSTRACT

A device for mounting wind turbine components and mounting method using the device is disclosed. The device is used to lift the components, such as the segments (1) forming the tower and the nacelle (2) of a wind turbine, these components are mounted to the structure of the wind turbine, the device having a lower portion (3) and an upper portion (4) coupled by a swivel joint (5), the lower portion (3) associated with a telescopic assembly (6) fastening to the segments (1) of the already-mounted tower portion of the wind turbine, while a lift (10) is movable along the whole of both portions (3) and (4), securing the components (1, 2) of the wind turbine to be mounted, to lift these components (1, 2) of the wind turbine to be mounted to the mounting positions thereof, in movements from the lower portion of the tower.

15 Claims, 12 Drawing Sheets

(51) Int. Cl.
  *B66C 23/18* (2006.01)
  *B66C 23/30* (2006.01)
  *B66C 23/32* (2006.01)

(58) Field of Classification Search
  CPC ............ F05B 2230/61; F05B 2240/912; F03D 13/10; F03D 13/20
  See application file for complete search history.

(56) References Cited

FOREIGN PATENT DOCUMENTS

| | | | |
|---|---|---|---|
| ES | 2435211 | A | 12/2013 |
| ES | 2630904 | T3 | 8/2017 |

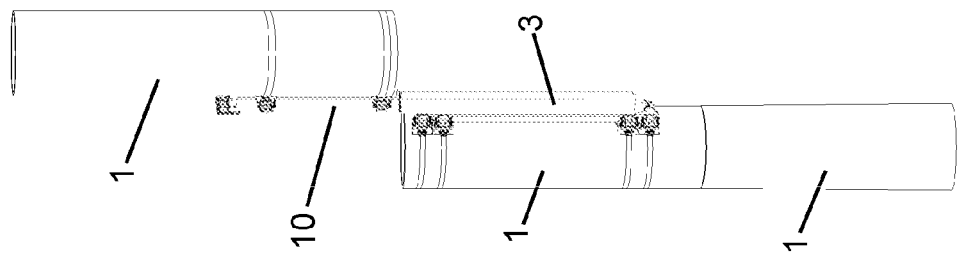
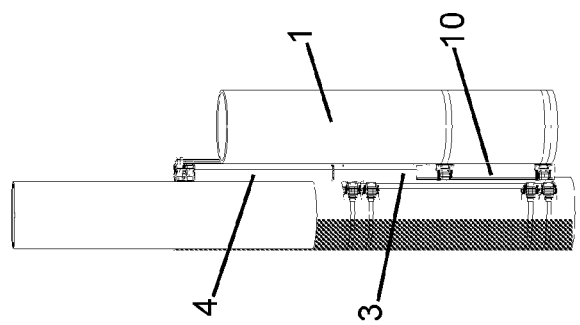
FIG. 5F
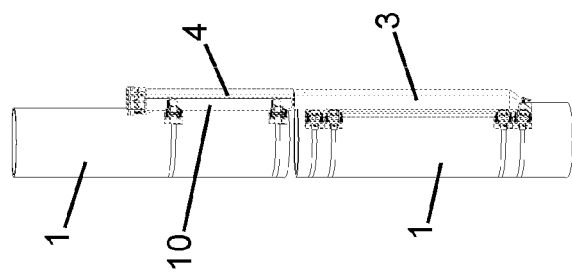
FIG. 5E
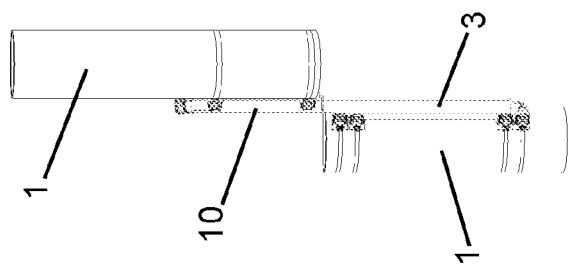
FIG. 5D
FIG. 5C

DEVICE FOR MOUNTING WIND TURBINE COMPONENTS AND MOUNTING METHOD USING SAID DEVICE

CROSS REFERENCE TO RELATED APPLICATION

This Application is a 371 of PCT/ES2019/070230, filed on Apr. 5, 2019 which claims the benefit of Spanish Patent Application No. P201830723, filed on Jul. 18, 2018, each of which are incorporated herein by reference.

TECHNICAL FIELD

The present invention is related to the structural mounting of wind turbines, proposing a device and a method that enable the mounting of the component parts of high-rise wind turbines to be carried out in a practical manner, even exceeding the height that the cranes with greater length currently available are able to reach.

STATE OF THE ART

Field wind turbines comprise a tower that is generally made up by a succession of height segments, which are superimposed and consecutively attached, a body called nacelle being arranged at the top, which is where the functional equipment of the wind turbine is included.

Conventionally, wind turbine structure mounting has been carried out with transportable cranes, operating with them from the ground to lift the structure portions of the wind turbine to the mounting positions thereof at the corresponding heights.

However, the evolutionary development has led to wind turbines being built with ever greater heights, to achieve embodiments of greater power, which has come to exceed the reach of conventional cranes operating from the ground, such that devices have been developed capable of lifting the structure components of the wind turbines from variable-height positions secured to the tower itself of the wind turbine under construction.

Moreover, the transport and use of the special cranes necessary to be able to undertake the mounting of wind turbines of a certain size entail a high cost.

However, current devices of this type for operating from securing positions on the wind turbine tower under construction are excessively complex and suffer from precarious safety, which causes the use thereof to be expensive and unreliable, affecting the structural profitability of the increase in height of wind turbines.

Climbing robot solutions are known, but they are not suitable for mounting and dismounting wind turbines since the configuration thereof does not enable the system to rotate nor is it capable of withstanding the loads necessary to lift heavy segments or elements such as, for example, the nacelle of the wind turbine.

Furthermore, the collars do not enable the projections which certain wind turbines exhibit in the form of signalling beacons or tension cables to be avoided, so the use thereof is limited.

OBJECT OF THE INVENTION

According to the present invention, a device is proposed with which a mounting process of the component parts of the wind turbines can be carried out in a practical manner, operating from variable height positions secured to the wind turbine tower under construction, thus enabling the construction of wind turbines of any height, without limitations in the length of cranes operating from the ground and without the projections present on the mast itself of the wind turbine being an impediment to the climbing method.

The device object of the invention comprises a lower portion and an upper portion coupled to each other by means of a swivel joint, the lower portion being associated with a telescopic assembly formed by two segments that can be extended and retracted, in which two pairs of collars are incorporated, two of which are fixed at the ends of the lower segment of the telescopic assembly, while the other two collars, alternately interspersed with the previous ones, are fixed at the ends of the mobile upper segment of the telescopic assembly, such that the collars of the upper segment are movable along the telescopic assembly when the upper segment is extended. Thereby, during the climbing manoeuvre there is always a tight collar in the centre of the device, either in the upper segment or in the lower segment, to guarantee the stability of the whole.

Furthermore, the upper portion of the device incorporates a hoist or a hydraulic cylinder at the upper end that supports a lift capable of moving along the entire device, said lift in turn being provided with other collars at the end areas thereof.

Thus, a device is obtained with which the structure portions of a wind turbine can be lifted to the respective mounting positions thereof, using the tower itself of the wind turbine under construction as a support, developing a mounting process by means of which the device moves by itself in a climbing actuation, so that each structural component portion of the wind turbine is collected by the device in the lower portion of the structure and brought up to the height corresponding to the mounting position to the structure.

The climbing actuation of the device on the tower of the wind turbine under construction is carried out by means of alternating movement and secure fastening on the tower, of the pairs of collars incorporated in the lower portion of the device that contains the telescopic assembly, so that each of the structural components of the wind turbine is brought to a height position close to that of the mounting position, which are brought to the corresponding final mounting positions thereof by means of the lift that is attached to the hoist of the upper portion of the device, and finally by means of the rotation of the upper portion of the device.

During the entire climbing process, the load to be installed is arranged on the lower portion of the device, thus achieving fewer stresses and moments being transmitted to the tower.

Additionally, the device has a weight distribution that is greater at the lower portion than at the upper portion, so that a more stable device is achieved.

For example, if the load to be installed and/or the weight of the device were arranged on the upper portion, this would generate a great instability, wherein very large moments would be transmitted that would tend to separate the upper portion of the device, thereby limiting to a great extent the tonnage that could be lifted with the device.

The interspersed location of the pairs of collars further enables a better distribution of the stresses generated on the tower of the wind turbine, giving the device a great stability by always having a tight collar at the midpoint, either in the upper or in the lower segment.

All the movements of the movable portions that make up the device are automatically actuated by a programmable control, arranging each one of the fastening collars for securing the device on the tower of the wind turbine under construction, as well as the fastening collars of the components of the wind turbine in the transport lift to the mounting position, a robot that automatically extends a fastening strap and a mechanism that automatically tightens and loosens the strap in the fastening positions, so that the whole actuation process of the device is automatic, achieving a great precision in the mounting actuations of the components of the wind turbine, with practically no risk of personal accidents during mounting.

The installation of the device does not require the use of cranes since it can be undertaken from the transport truck itself by actuating a cylinder system that enables the vertical positioning and fastening thereof to the lower segment of the wind turbine.

Thus, with a device of reduced dimensions, easy to transport to the installation sites of the wind turbines and simple to install, wind turbines of any height can be built in a practical and profitable manner, without the limitation of the reach of operating cranes from the ground.

The device additionally comprises horizontal translation means that are arranged in the fastening means of the telescopic assembly and other horizontal translation means that are arranged in the fastening means of the lift, in order to respectively enable a horizontal separation movement with respect to the telescopic assembly and with respect to the lift. In the first case, in order to maintain the verticality of the lower and upper portion of the device when it is climbing a frustoconical tower, this aspect being key when the rotating manoeuvre from the upper portion with respect to the lower portion is carried out. In the second case, this horizontal movement is necessary between the fastening collars (or the lattice where appropriate) of the new component to be incorporated and the lift, in order to make the axis of the new tower segment (or the axis of the coupling of the nacelle to the tower) that is incorporated coincide with the axis of the already-built tower segments.

Therefore, the device object of the invention has very advantageous features for the wind turbine mounting function for which it is intended, acquiring a life of its own and a preferential character with respect to the conventional techniques and means used for this function.

DESCRIPTION OF THE FIGURES

FIGS. 5B to 5F show a sequence of the positions where the successive component segments are mounted to the tower of a wind turbine, according to the invention.

DETAILED DESCRIPTION OF THE INVENTION

Figure 1:
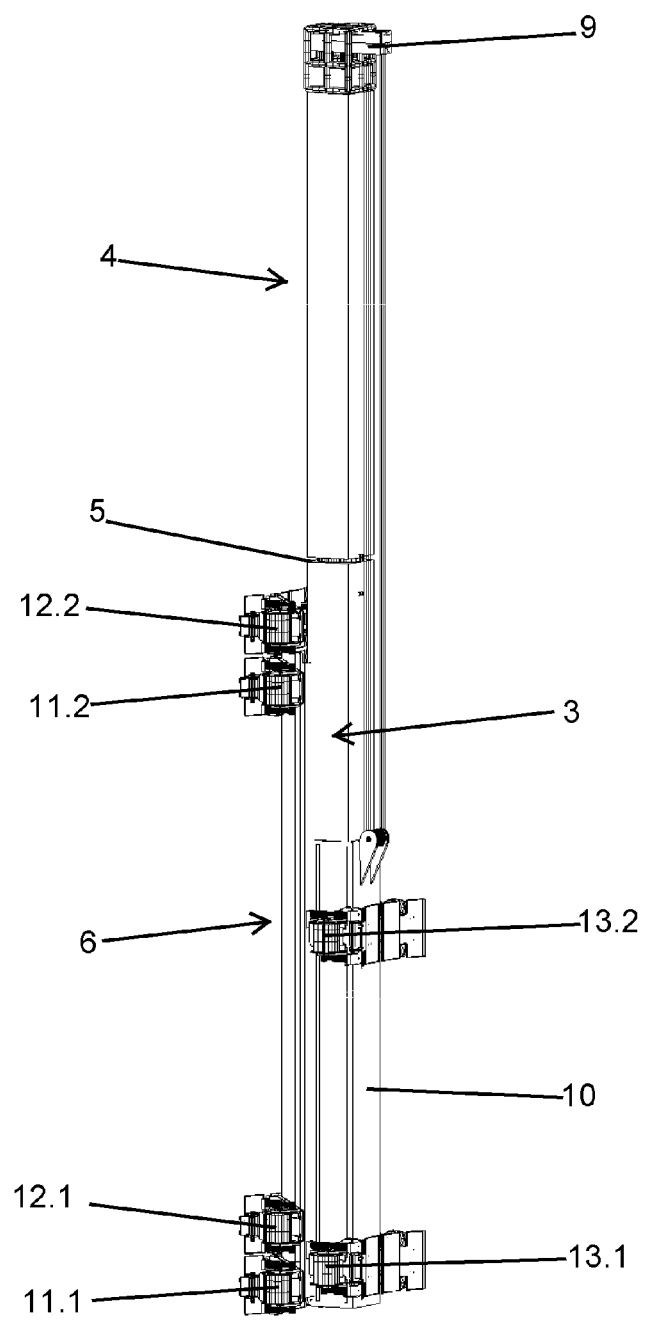
FIG. 1 shows a perspective view of the assembly of the device for mounting wind turbines according to the object of the invention.
Figure 2:
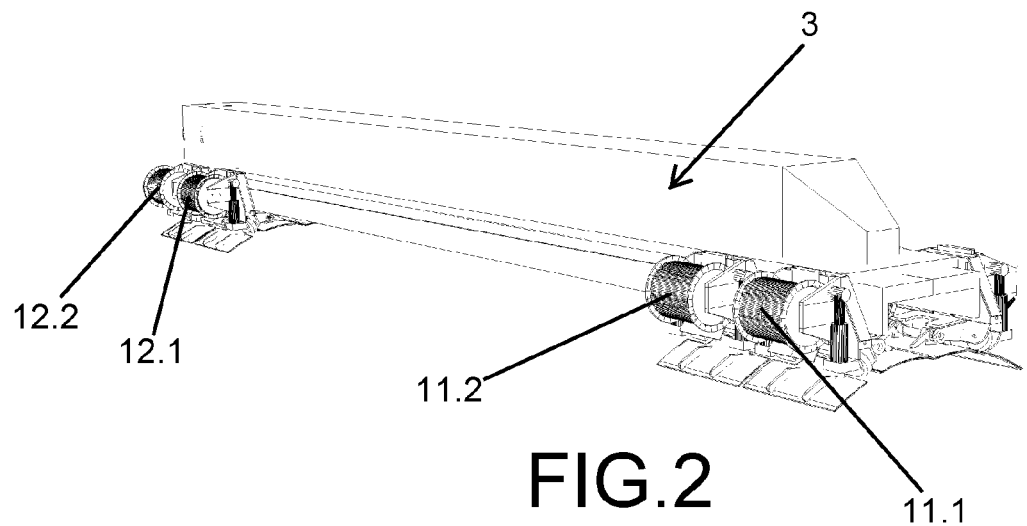
FIG. 2 is a perspective view of the lower portion of the device, in the retracted position.

The object of the invention relates to a device and a method for the structural mounting of wind turbines, bringing the structural components of the wind turbine, such as the segments (1) forming the tower of the wind turbine and the nacelle (2), to the mounting positions thereof, from variable height situations secured to the tower itself of the wind turbine being built.

For this purpose, the proposed device comprises a lower portion (3) and an upper portion (4), which are coupled to each other by means of a swivel joint (5), the lower portion (3) being associated with a telescopic assembly (6) formed by two segments (7) and (8), which can be extended and retracted, while the upper portion (4) incorporates a hoist (9) at the end from which a lift (10) is suspended that is movable along the whole of the device.

Figure 4:
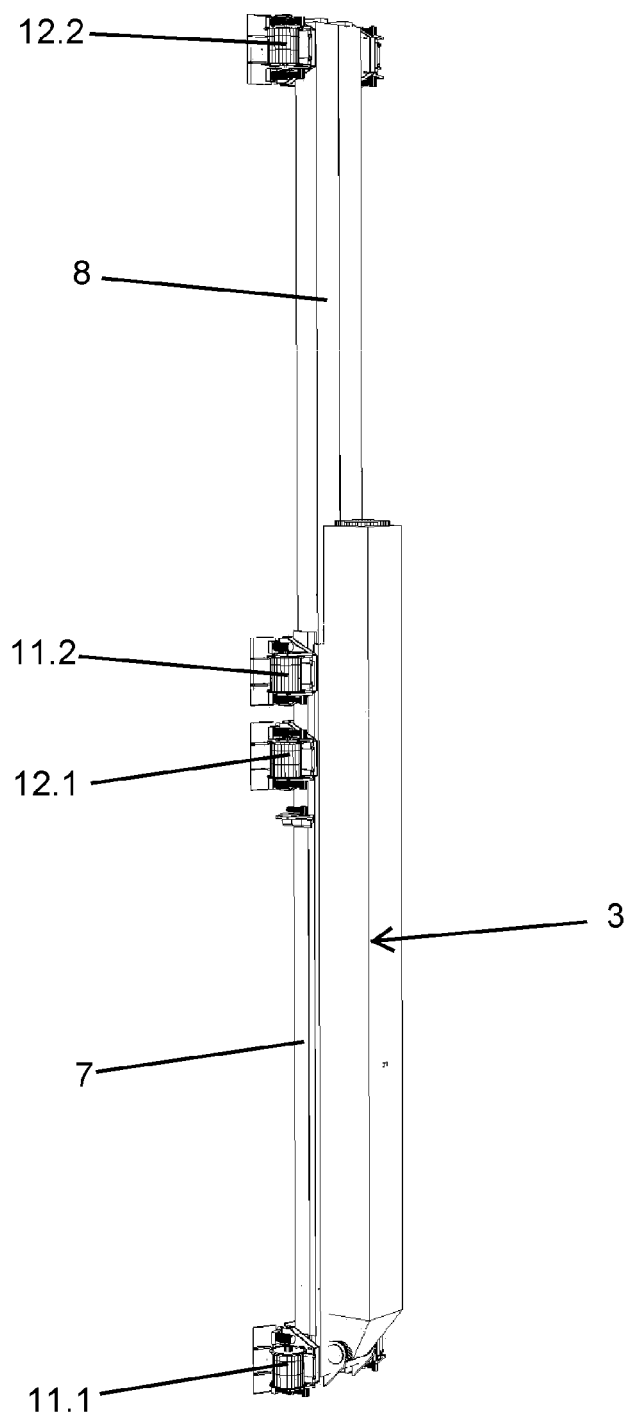
FIG. 4 is a perspective view of the lower portion of the device, in the extended position.

As shown in FIG. 4, two pairs of collars (11.1, 11.2) and (12.1, 12.2) are incorporated in the telescopic assembly (6), the collars (11.1, 11.2) being fixed at the end areas of the lower segment (7) of the aforementioned telescopic assembly (6), while the other two collars (12.1, 12.2) are fixed at the end areas of the upper segment (8) of the telescopic assembly (6), and the collar (12.1) is interspersed between the collars (11.1, 11.2) of the lower segment (7). Thus, the two collars (12.1, 12.2) of the upper segment (8) are movable with respect to the other two collars (11.1, 11.2) of the lower segment (7) when the upper segment (8) of the telescopic assembly (6) extends, leaving the collar (12.1) in a position always lower than (11.2), thereby ensuring a greater stability of the equipment, by having a tight collar inserted between the segments (7) and (8) at all times, at any time during the climbing sequence.

Figure 3:
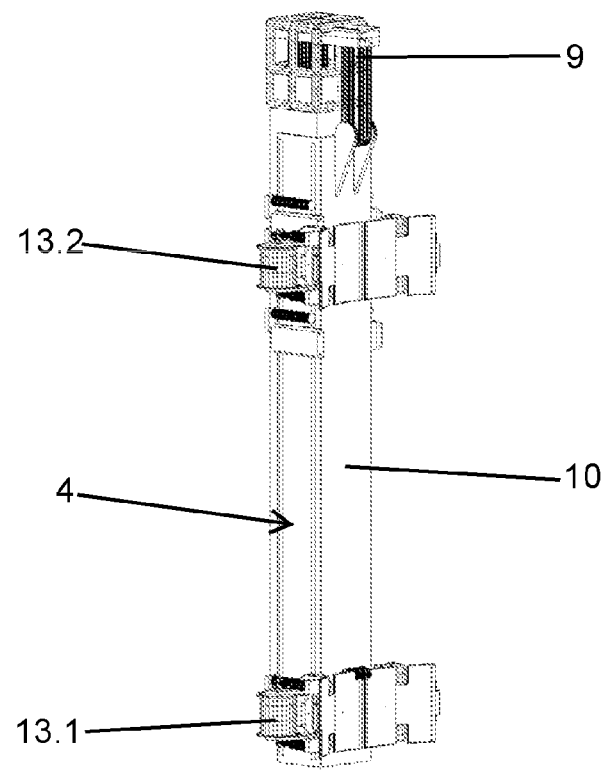
FIG. 3 is a perspective view of the upper portion of the device.
Figure 8:
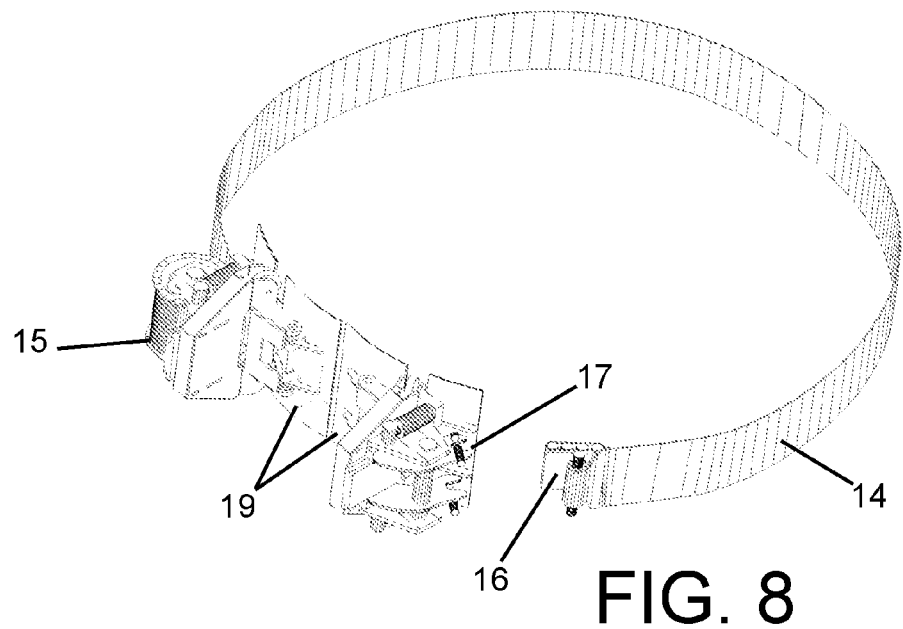
FIG. 8 is a perspective view of a collar of the device of the invention, in the operative extension phase of the strap of the collar.

As shown in FIG. 1 or 3, the lift (10) in turn incorporates another pair of collars (13.1, 13.2), which are fixed at the end areas of said lift (10), each one of the collars (11.1, 11.2, 12.1, 12.2, 13.1, 13.2) being provided with a strap (14) that is retracted on a reel (15) (see FIG. 8) from which it can extend to fasten around a component of the wind turbine, as can be any one of the segments (1) forming the tower of a wind turbine to be incorporated to the tower once it is built. When it is required to lift the nacelle (2), the lift (10) incorporates a lattice instead of the collars (13.1, 13.2), see for example FIGS. 6A to 6C.

The extension and retraction of the telescopic assembly (6), as well as the translation movements of the collars (12.1, 12.2) along the telescopic assembly (6) and the actuations of each one of the collars (11.1, 11.2, 12.1, 12.2, 13.2, 13.2) for the fastenings for securing, are automatically actuated by a programmable control, such that, once the desired programming is established, when the operation is started, the device acts by itself developing the functional activity corresponding to the programming.

Figure 9A:
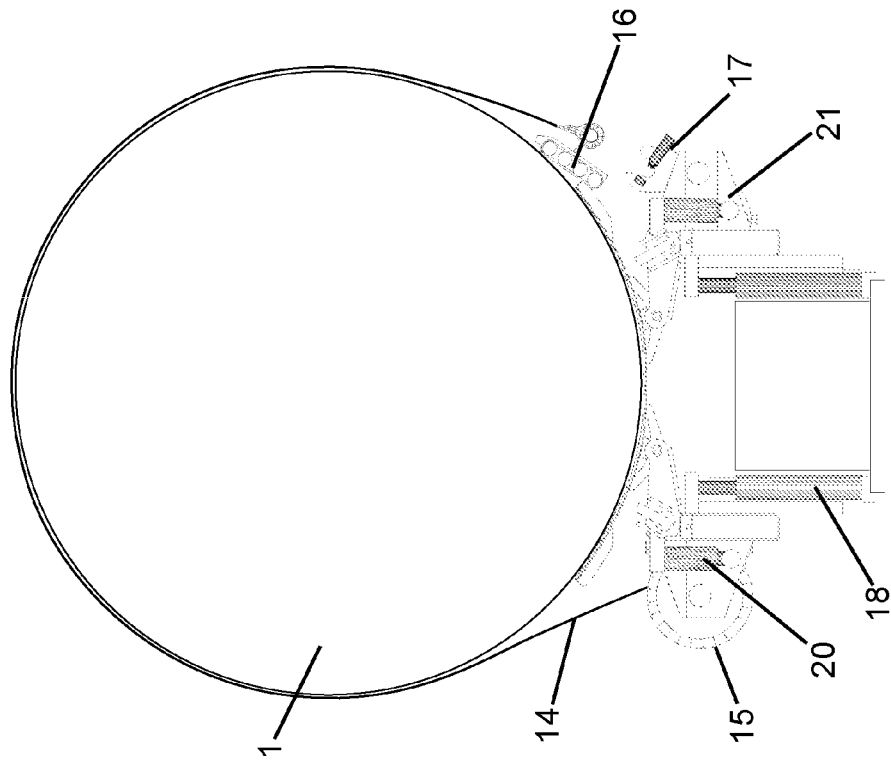
FIGS. 9A to 9D show a sequence of positions of a collar of the device of the invention in the extension operation of the strap of the collar.
Figure 9B:
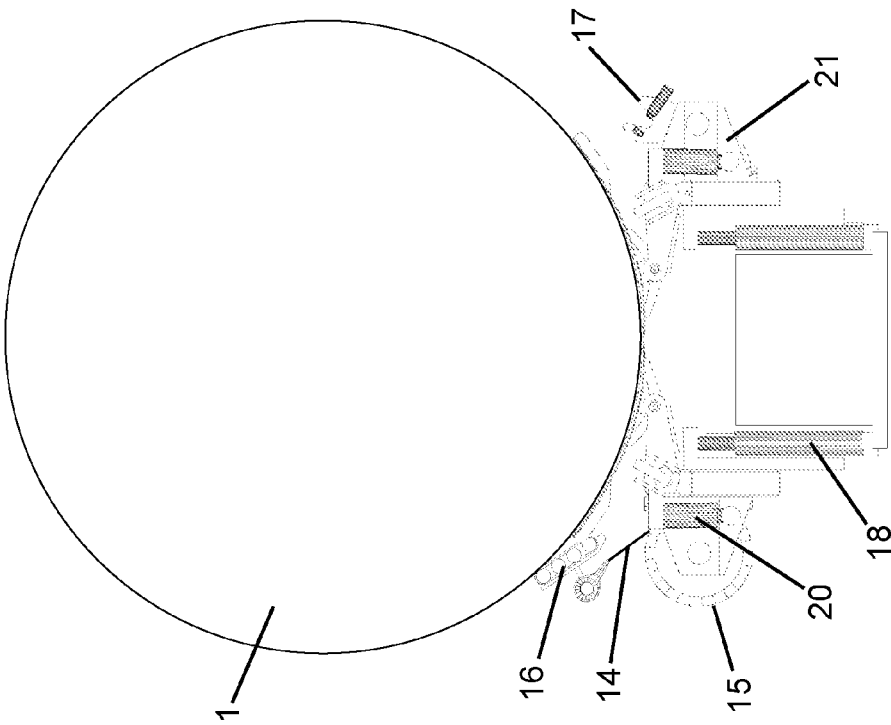
Figure 9D:
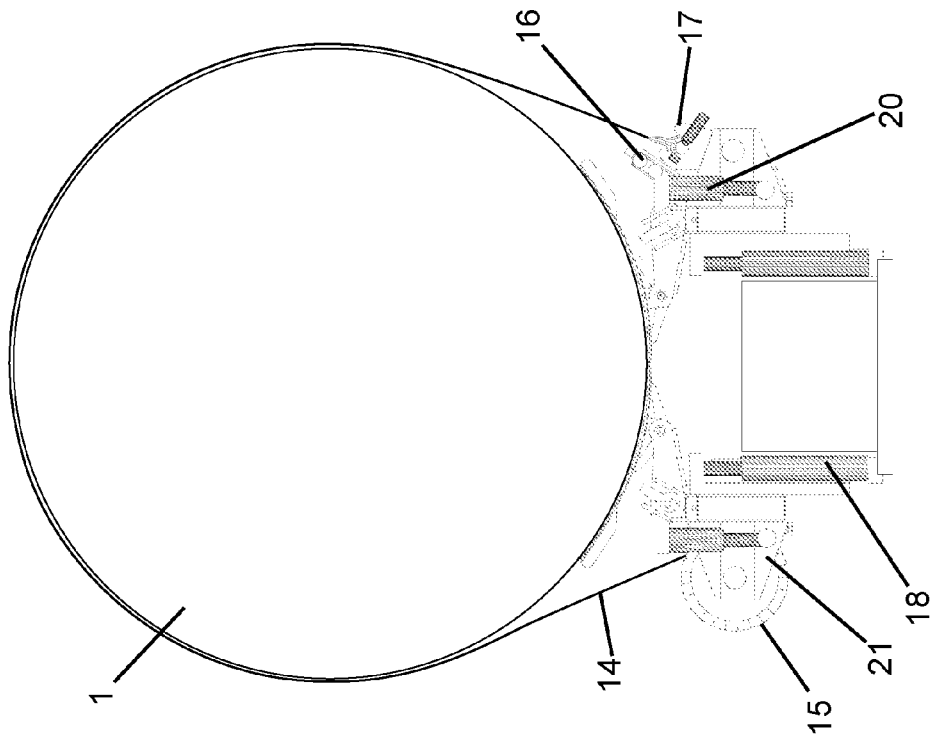
Figure 9C:
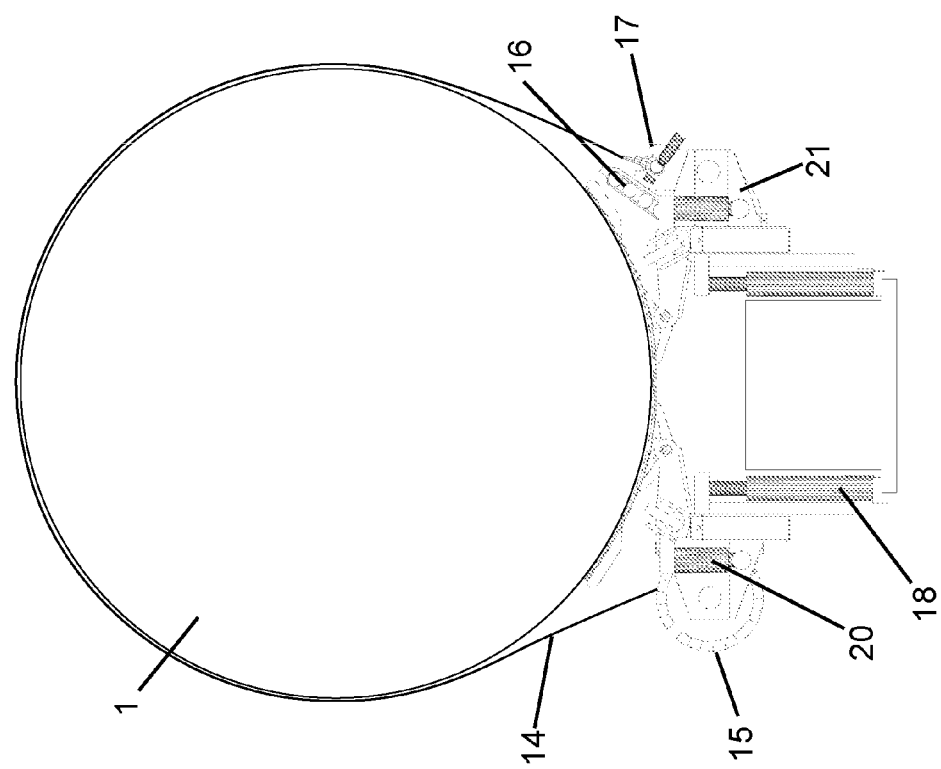

To this end, each collar (11.1, 11.2, 12.1, 12.2, 13.1, 13.2) incorporates a robot (16) that automatically actuates the extension of the strap (14) from the reel (15) to an anchor (17), surrounding the element to which fastening must be established, as shown in FIGS. 9A to 9C, each one of the collars (11.1, 11.2, 12.1, 12.2, 13.1, 13.2) further having a mechanism formed by cylinders (18) that actuate on pads (19) in order to press them against the fastening element and other cylinders (20) that actuate on runners (21) in order to exert a tensioning traction of the corresponding strap (14).

The robot (16) is fixed to the surface of the segments (1) preferably by means of magnetic actuation. In the case of towers that are not made of steel, it will be performed by means of suction.

Figure 5B:
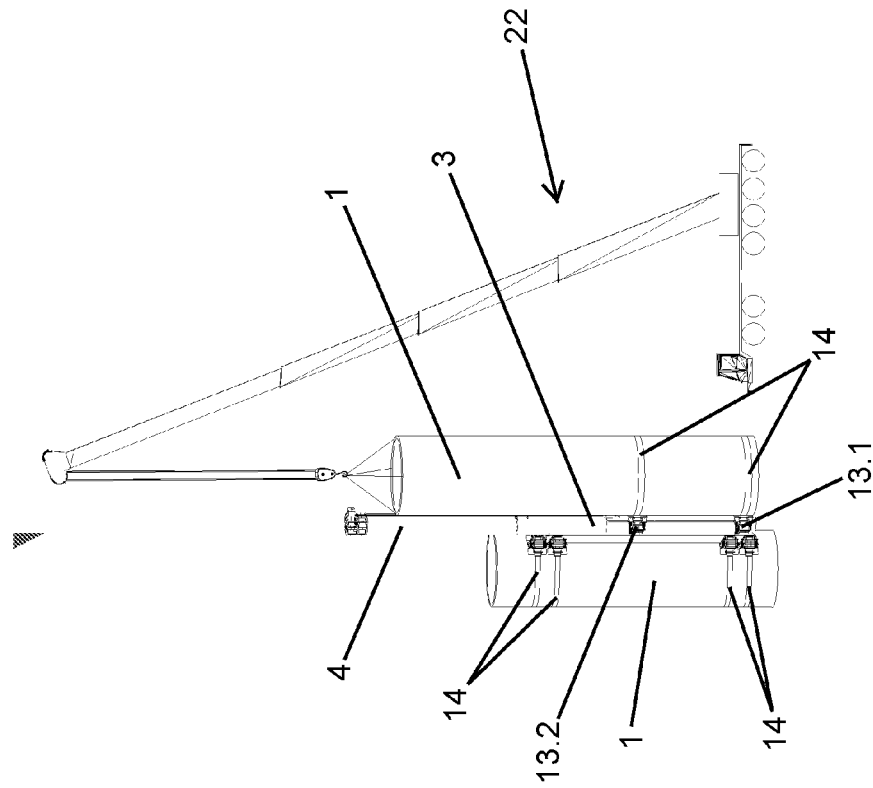
Figure 5A:
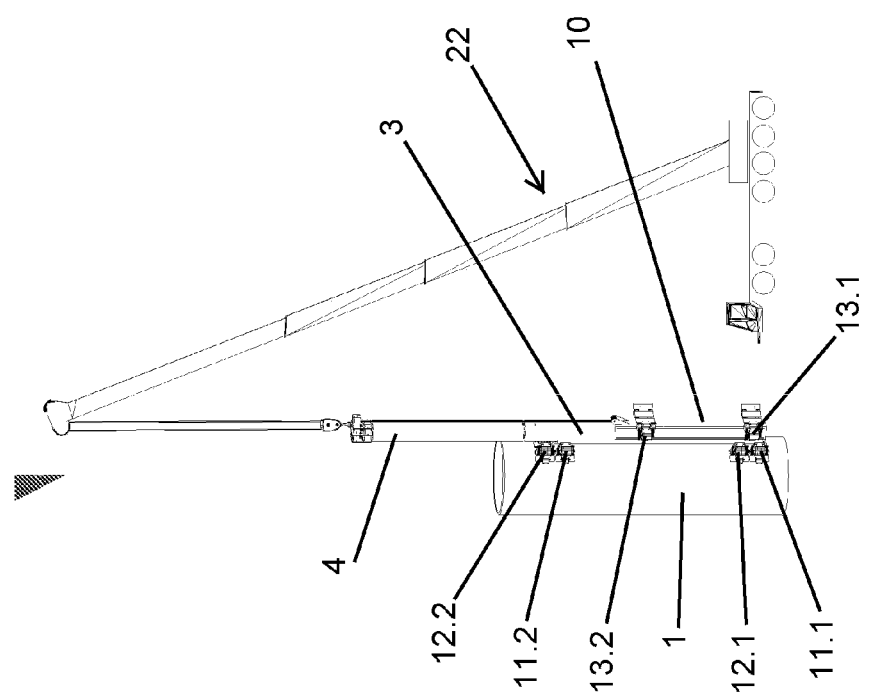
FIG. 5A shows the installation of the device with the aid of a crane.

Thus, the device enables a mounting process of structural components of a wind turbine (see FIGS. 5 and 6) to be developed, as follows:

As shown in FIG. 5A, once the base foundation of the wind turbine has been built and at least one tower segment (1) of the tower of the wind turbine has been installed, in order to incorporate the other segments (1) forming the tower and the nacelle (2) of the wind turbine into the mounting, by means of a conventional crane (22), or a self-installation system such as that shown in the figures as the method reflected in FIGS. 12A to 12D, the device object of the invention is laterally placed on the installed segment (1) of the tower, as shown in FIG. 5A, wherein the device, which is secured by itself, is activated by means of the collars (11.1, 11.2 and 12.1, 12.2) of the lower portion (3) of the device, on the aforementioned installed segment (1) of the tower, as shown in FIG. 5B.

Next, as shown in FIG. 5B, by means of the conventional crane (22) another tower segment (1) is incorporated, placing it laterally on the lift (10) of the device, wherein the lift (10) is secured by itself, by means of the collars (13.1, 13.2) thereof, to said new tower segment (1), as shown in the same FIG. 5B.

Once this is the case, the hoist (9) of the upper portion (4) of the device lifts the lift (10) to a position wherein the lower end of the new tower segment (1) is at a higher level than the upper end of the already-installed tower segment (1), as shown in FIG. 5C.

In that position, the upper portion (4) of the device rotates with respect to the lower portion (3), by means of the swivel joint (5) for which it is convenient that the device is previously in a completely vertical position, said position being achieved by means of horizontal translation means (not shown) present between the collars (11.1, 11.2 and 12.1, 12.2) and the segments (7) and (8) of the telescopic assembly (6) that compensate the verticality of the device against the angle of the generatrix of the cone of the external surface of the tower during climbing, placing the new tower segment (1) correspondingly above the already-installed segment (1), as shown in FIGS. 5C and 5D.

Next, and when it is required to mount frustoconical towers, a horizontal movement is carried out in order to move the new tower segment (1) to be installed closer until the axis of symmetry thereof coincides with the already-installed segment (1). This movement is carried out by means of other horizontal translation means (not shown) that the collars (13.1, 13.2) have, such that said horizontal translation means enable a movement of separation of the collars (13.1, 13.2) with respect to the lift (10).

Next, a secure fastening is established between the two tower segments (1) correspondingly arranged, the device is lowered along the attached segments (1) and the lift (10) is lowered to the lower position, wherein a new tower segment (1) is incorporated thereon, secured, as shown in FIG. 5E.

Climbing is then carried out by means of the set of the collars (11.1, 11.2 and 12.1, 12.2) of the lower portion (3) of the device, and by means of the horizontal translation means present between the collars (11.1, 11.2 and 12.1, 12.2) and the segments (7) and (8) the move closer to or separate from said collars in order to maintain the verticality of the device at all times until it is lifted to the last previously installed tower segment (1) and by means of the lift (10) the new tower segment (1) is lifted until it exceeds the level of the upper end of the previously installed tower segment, as shown in FIG. 5F, to repeat, in the same manner as with the previously installed tower segment (1), the attachment of the new tower segment (1) to the previously installed tower segment (1).

In the same manner as the ascent climb, by means of the set of collars (11.1, 11.2 and 12.1, 12.2), the device can descend to the foot of the tower under construction, in order to collect each one of the tower segments (1) and bring them to the position where they are mounted to the respective previously installed tower segment (1), repeating the lifting and mounting sequence of each one of the segments (1) forming the tower being built, in the manner explained.

Figure 6A:
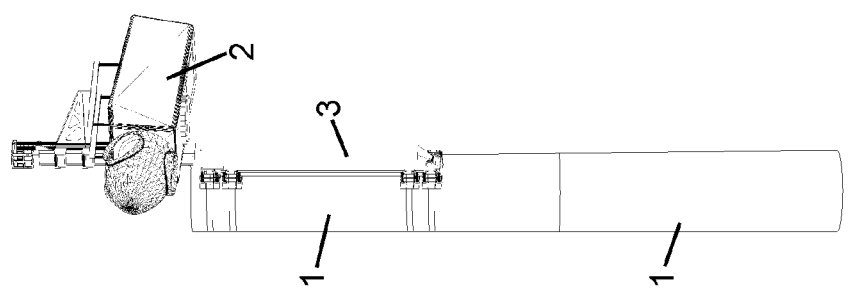
FIGS. 6A to 6C show a sequence of the positions where the nacelle is mounted to a wind turbine, according to the invention.
Figure 6B:
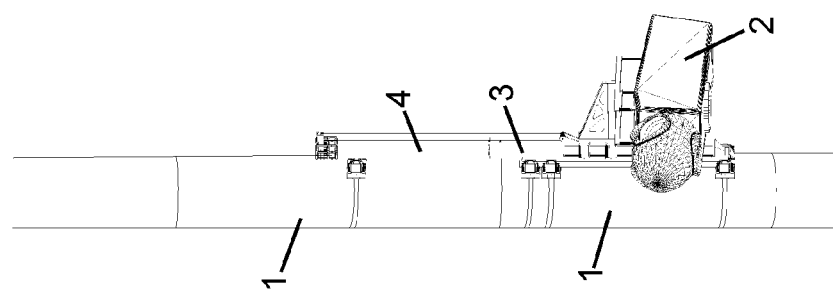
Figure 6C:
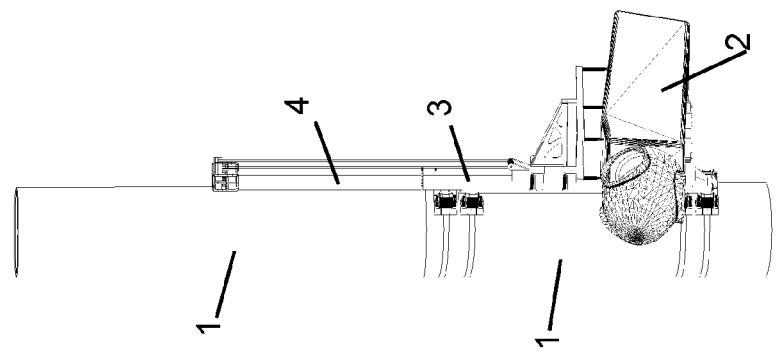
Figure 7:
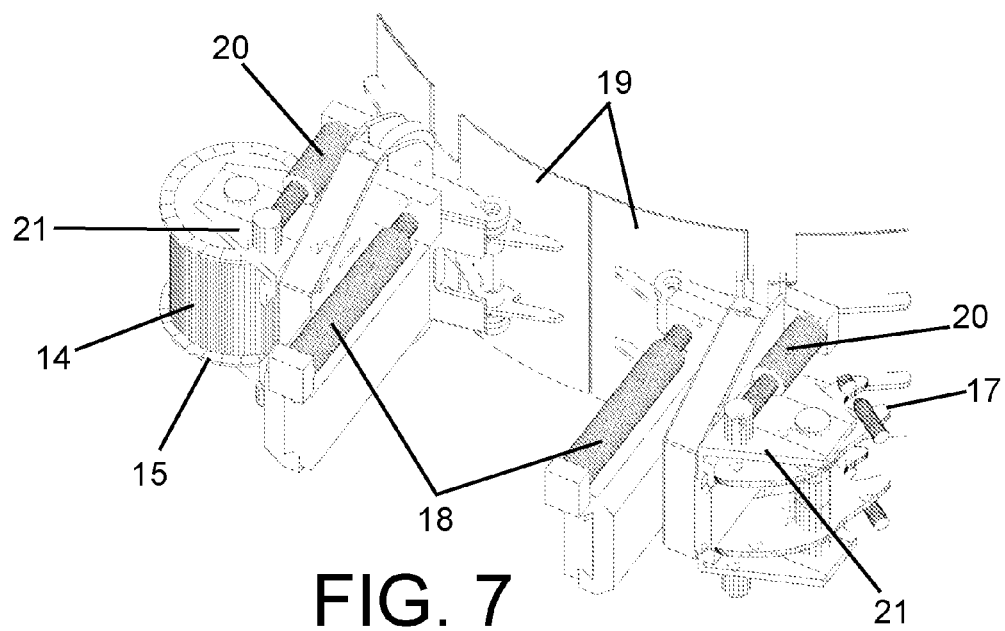
FIG. 7 is a perspective view of the functional portion of one of the fastening collars for securing used by the device of the invention.

The lifting of the nacelle (2) of the wind turbine, to the position where it is mounted on the top of the built tower, is carried out by means of a sequence of collection in the lower portion and transport by climbing to the mounting position, similar to the process that is carried out with the segments (1) forming the tower, as shown in FIGS. 6A to 6C with the particular feature that the collars (13.1) and (13.2) are replaced by an adjustable lattice structure from which the whole of the nacelle-hub is suspended, or the same are suspended separately in the event that due to the weight thereof it is necessary to carry out the manoeuvre in two ascents.

The climbing of the device on the tower of the wind turbine under construction, both for the mounting of the segments (1) of the tower, and for the mounting of the nacelle (2), is carried out, from any of the securing positions for securing the device to the tower of the wind turbine, such as the one shown in FIG. 6A, loosening the fastening of the collars (12.1, 12.2), while the securing is maintained with the fastening of the collars (11.1, 11.2), in order to move the loosened collars (12.1, 12.2), until the lower collar (12.1) of the upper segment (8) abuts the upper collar (11.2) of the lower segment (7), as shown in FIG. 6B, the collars (12.1, 12.2) then being secured, by tightening the straps (14) thereof and thus start the climbing movement. Once the head of the tower has been reached, the lift (10) is lifted, with the component of the wind turbine that is fastened, as shown in FIG. 6C, repeating this process, step by step, along the tower portion of the wind turbine that is built, in order to lift each structural component of the wind turbine to the corresponding position where each one of them is mounted.

The lowering of the device to the lower portion of the tower of the wind turbine, in order to collect the components of the wind turbine to be mounted, is carried out by moving the device down the length of the tower, with a step-by-step movement, same as during climbing, but in reverse direction.

Figure 10:
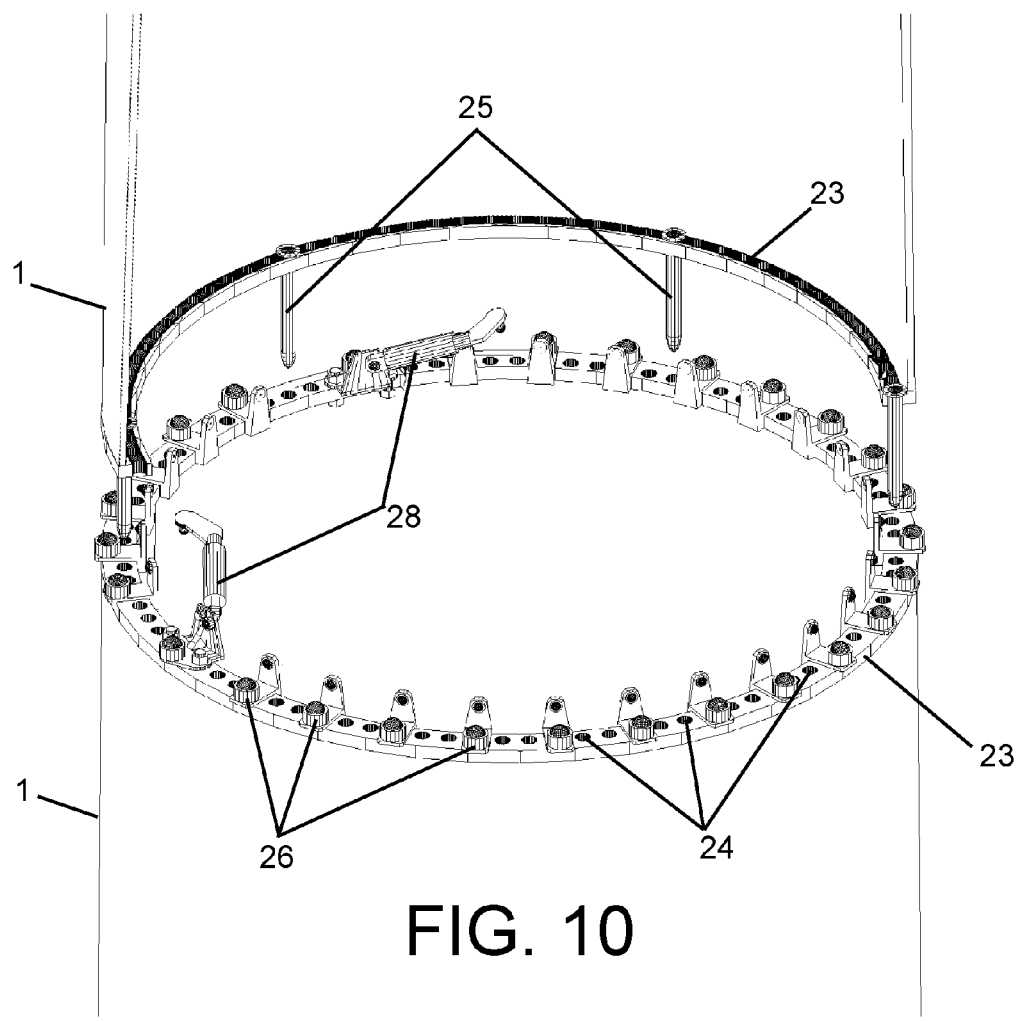
FIG. 10 is a perspective view of a system of ball bearings that are arranged for the aligned attachment of two consecutive segments of a wind turbine tower according to the object of the invention.

As shown in FIG. 10, the ends of the segments (1) of the wind turbine tower have flanges (23) with holes (24) in which guides (25) are inserted in order to fix consecutive segments (1). Therefore, when the attachment of two consecutive segments (1) is required it is necessary to align the holes (24) of the flanges (23). Since the upper segment (1) to be arranged on the lower segment (1) might not have the holes (24) aligned, since even if at the time of clasping the new segment (1) to be attached the starting point is an approximate radial position, during climbing, the equipment may slightly vary the radial position thereof and thus cause a misalignment of the holes (24) that would make the subsequent screwing thereof impossible.

Accordingly, as shown in FIG. 10, the use of ball bearings (26) has been envisaged in some of the holes (24) of the flange (23) of the lower segment (1) that enable the misalignment to be corrected.

Thus, to carry out the attachment of two consecutive segments (1), the following steps are carried out. Firstly, the ball bearings (26) are arranged in some of the holes (24) of the flange (23) of the lower segment (1), then the upper segment (1) is lowered until making contact with the ball bearings (26), the upper segment (1) is rotated on the bearings (26) by means of hydraulic cylinders (28) until the holes (24) of the flanges (23) of the two consecutive segments (1) are aligned, at this moment, a series of guides (25) are introduced in order to ensure that the upper segment (1) is not able to rotate with respect to the lower segment (1), but without tightening them in order to enable the upper segment (1) to move vertically, the upper segment (1) is made to slightly ascend in order to remove the bearings (26), and finally the upper segment (1) is lowered again in order to place it on the lower segment (1), the holes (24) being aligned, therefore enabling the introduction of bolts in the holes (24) in order to screw the two tower segments, the guides (25) are removed and finally all the bolts are tightened, ensuring the attachment.

Figure 11:
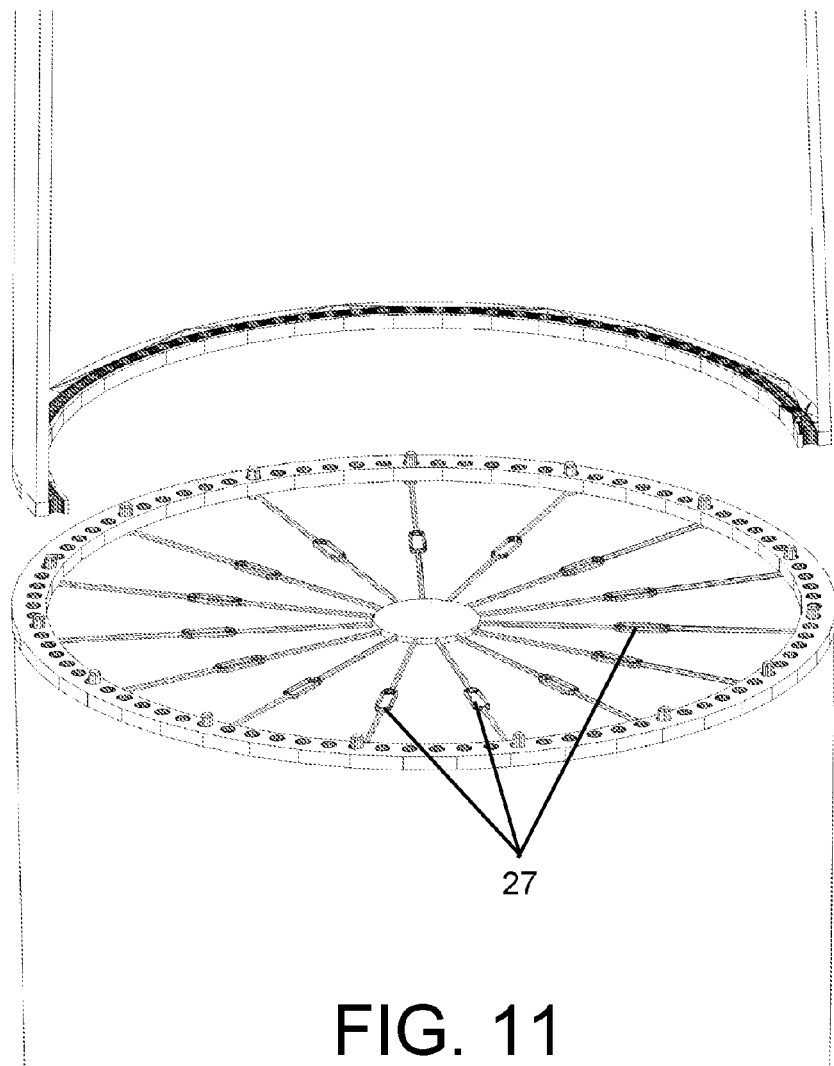
FIG. 11 is a perspective view of a system that is envisaged for maintaining the roundness (avoiding ovalisation) of the segments of a wind turbine tower in the structural mounting of the tower according to the invention.
Figure 12A:
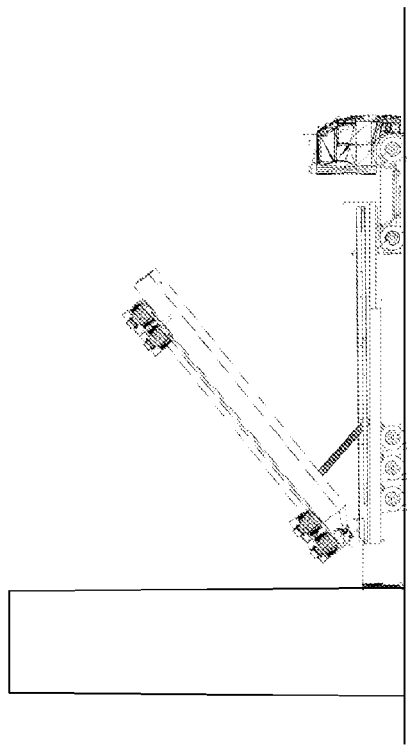
FIGS. 12A to 12D show a sequence of the installation method of the device on the base of the wind turbine in the case that the installation of the lower portion of the device has been made with an adapted platform that incorporates a telescopic cylinder and that is mounted on a semi-trailer in order to present the lower portion to the wind turbine tower in a vertical position.
Figure 12B:
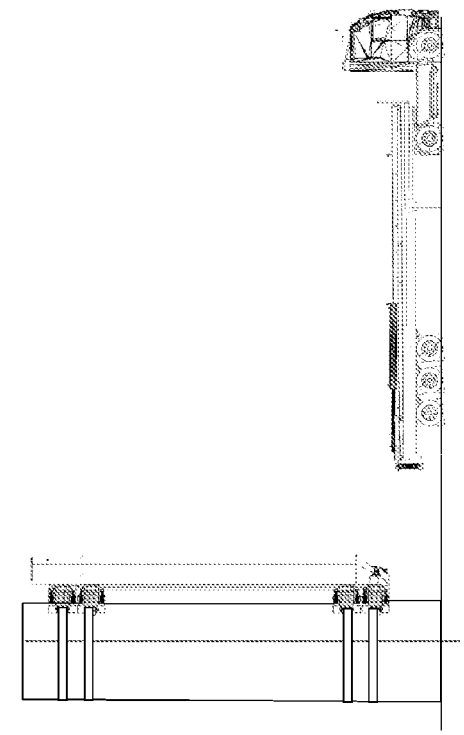
Figure 12C:
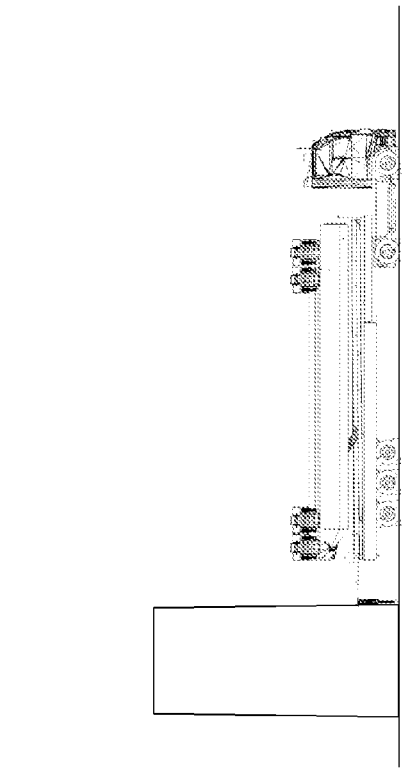
Figure 12D:
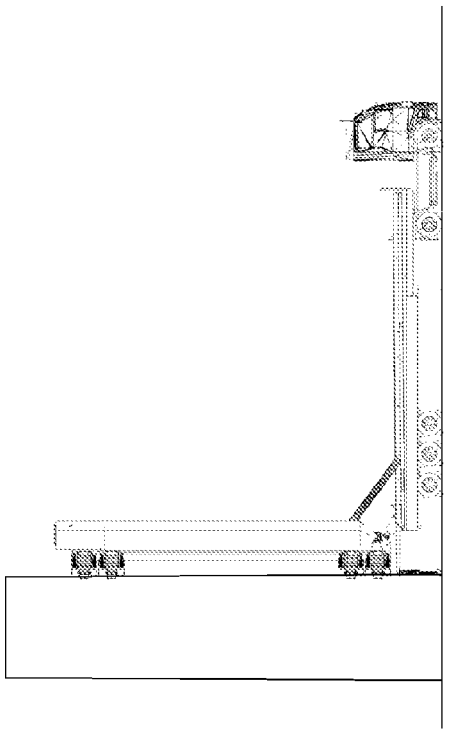

Moreover, inside the flanges (23) of the segments (1) forming the wind turbine tower, the incorporation of a system of radial braces (27) is envisaged, as shown in FIG. 11, in order to maintain the roundness of the aforementioned tower segments (1) during the attachment process, in order to prevent the configuration of said tower segments (1) from deforming through the stresses to which they are subjected during the segment (1) alignment process, as well as during the structural mounting of the wind turbine tower, due to the pressure exerted by the collars (11.1, 11.2 and 12.1, 12.2).

In the method reflected in FIGS. 12A to 12D, the installation of the mounting device on an already-installed segment (1) of the tower of the wind turbine is carried out from a horizontal position on a trailer of a transport vehicle to a vertical position by means of the action of tilting means incorporated into the transport vehicle.

The invention claimed is:

1. A device for mounting a tower segment or a nacelle of a wind turbine to an already mounted tower portion of the wind turbine, the device comprising:
   a lower portion and an upper portion coupled by means of a swivel joint;
   first fastening means for securing the lower portion to the already mounted tower portion of the wind turbine;
   a lift that is movable along the whole of the tower and the upper portion; and
   second fastening means for securing the tower segment or the nacelle to the lift,
   wherein the center of gravity of the device lies in the lower portion.

2. The device for mounting wind turbine components, according to claim 1, wherein the device further comprises a telescopic assembly comprising a lower segment and an upper segment capable of extending and retracting.

3. The device for mounting wind turbine components, according to claim 1, wherein the lift is suspended from a hoist incorporated at an end of the upper portion of the device.

4. The device for mounting wind turbine components, according to claim 2, wherein the telescopic assembly comprises two pairs of collars interspersed with each other, two of the collars are fixed at end areas of the lower segment of the telescopic assembly, while the other two collars are fixed at end areas of the upper segment, such that the collars of the upper segment are movable with respect to the collars of the lower segment when extended.

5. The device for mounting wind turbine components, according to claim 1, wherein the fastening means incorporated in the lift are collars arranged at end areas of said lift.

6. The device for mounting wind turbine components, according to claim 1, wherein the fastening means incorporated in the lift are a lattice.

7. The device for mounting wind turbine components, according to claim 4, wherein each one of the collars has a strap that is retracted on a reel, from which it can be extended by a robot to an anchor point.

8. The device for mounting wind turbine components, according to claim 4, wherein each one of the collars has a mechanism formed by pads that are actuated by cylinders in order to press against the wind turbine component to be secured.

9. The device for mounting wind turbine components, according to claim 8, wherein each one of the collars has a mechanism formed by runners that are actuated by cylinders in order to tighten the corresponding strap.

10. The device for mounting wind turbine components, according to claim 2, wherein the device moves horizontally such that a horizontal separation movement is made with respect to the telescopic assembly and with respect to the lift.

11. A method for mounting wind turbine components using the mounting device of claim 1, comprising
   incorporating the mounting device to an already-installed segment of the tower of the wind turbine to be built,
   fastening to said already-installed tower segment, by means of the first fastening means of the lower portion of the mounting device and the lateral incorporation to the lift located on the lower portion of the device, of a subsequent component to be mounted to the structure of the wind turbine,
   fastening said component to be mounted with the second fastening means, in order to lift the component to be mounted to the mounting height by moving the lift to the upper portion of the device, which rotating on the swivel joint positions the component to be mounted in correspondence above the previously mounted tower segment, in order to establish a fastening for securing the component to be mounted in that position, the mounting device moving, in order to collect each component of the wind turbine to be mounted in the lower portion of the tower and lifting to the corresponding mounting position, by means of a step-by-step movement, with the fastening means, on the already-built tower portion of the wind turbine.

12. The method for mounting wind turbine components, according to claim 11, wherein the installing of the mounting device to an already-installed segment of the tower of the wind turbine is carried out starting from a horizontal position on a trailer of a transport vehicle to a vertical position.

13. The method for mounting wind turbine components, according to claim 11, wherein the step-by-step movement of the mounting device on the already-built tower portion of the wind turbine develops by means of successive extensions and retractions of the telescopic assembly, in combination with successive alternating tightening and loosening of the pairs of collars and the movement of the mobile collars along the whole of the telescopic assembly, for establishing fastenings in successive advancement positions, upwards or downwards, to the already-built tower portion of the wind turbine.

14. The method for mounting wind turbine components, according to claim 11, wherein the attachment between the consecutive tower segments that are mounted superimposed on one another, is established by means of flanges with holes in which guides are inserted, wherein in order to align the holes of the flanges of consecutive segments, ball bearings are used that are arranged in some of the holes.

15. The method for mounting wind turbine components, according to claim 1, wherein a system of radial braces is arranged inside flanges of the tower segments that are consecutively attached in order to form the tower of the wind turbine to be built, which maintains the roundness of the aforementioned tower segments unaltered during the structural mounting operations of the towers of the wind turbine.

* * * * *